United States Patent
Matho et al.

(10) Patent No.: US 11,549,704 B2
(45) Date of Patent: Jan. 10, 2023

(54) FILTER DEVICE AND METHOD FOR CHANGING A FILTER ELEMENT

(71) Applicants: Lufttechnik Gransee GmbH, Gransee (DE); Oerlikon Textile GmbH & Co KG, Remscheid (DE)

(72) Inventors: Rainer Matho, Berlin (DE); Andreas Mueller, Zehdenick (DE); Stephan Rickerts, Grossenaspe (DE); Ernst Claussen, Steinfeld (DE); Hauke Petersen, Oering (DE); Frank Knoedler, Bruegge (DE); Sonja Dittscher, Trappenkamp (DE)

(73) Assignees: Lufttechnik Gransee GmbH, Gransee (DE); Oerlikon Textile GmbH & Co KG, Remscheid (DE)

( * ) Notice: Subject to any disclaimer, the term of this patent is extended or adjusted under 35 U.S.C. 154(b) by 35 days.

(21) Appl. No.: 17/225,254

(22) Filed: Apr. 8, 2021

(65) Prior Publication Data
US 2021/0318007 A1 Oct. 14, 2021

(30) Foreign Application Priority Data
Apr. 9, 2020 (DE) .................... 10 2020 110 082.5

(51) Int. Cl.
*B01D 39/00* (2006.01)
*F24F 8/10* (2021.01)
*B01D 46/26* (2006.01)

(52) U.S. Cl.
CPC ................ *F24F 8/10* (2021.01); *B01D 46/26* (2013.01)

(58) Field of Classification Search
CPC .... B01D 46/10; B01D 46/0005; B01D 46/88; Y10S 55/31; Y10S 55/09
(Continued)

(56) References Cited

U.S. PATENT DOCUMENTS 3,354,616 A 11/1967 Lucas
4,124,361 A * 11/1978 Revell ............... B01D 46/0098
55/502
(Continued)

FOREIGN PATENT DOCUMENTS

CN 107913551 A 4/2018
DE 2754513 A1 11/1978
(Continued)

OTHER PUBLICATIONS

European Search Report dated Oct. 13, 2021 issued in EP 21 16 4606 (with English translation of relevant parts).
(Continued)

*Primary Examiner* — Long T Tran
*Assistant Examiner* — James J Kim
(74) *Attorney, Agent, or Firm* — Collard & Roe, P.C.

(57) ABSTRACT

A filter device for filtering particles from an air flow has an inlet channel through which the air to be cleaned flows, at least one filter element through which the air can flow and which is held replaceably in a flow channel, and an outlet channel through which the cleaned air flows. The filter device has an insertion chamber which can be closed by a door and from which a filter element can be fed to the flow channel, and an output chamber which can be closed by a closure element and into which a filter element can be fed from the flow channel. A cover is attachable to the filter element, which covers a filter cake on the filter element so that the unit of filter element and cover is removable from the output chamber together.

13 Claims, 13 Drawing Sheets

(58) Field of Classification Search
USPC .......................................................... 55/490
See application file for complete search history.

(56) References Cited

U.S. PATENT DOCUMENTS

| | | | | |
|---|---|---|---|---|
| 4,193,779 | A | | 3/1980 | Hencke |
| 4,251,245 | A | * | 2/1981 | Reynolds ............... B01D 46/10 55/484 |
| 4,497,642 | A | | 2/1985 | Hackney |
| 5,837,040 | A | * | 11/1998 | Caughron .......... B01D 46/0091 55/467 |
| 6,248,237 | B1 | * | 6/2001 | Mery ................. B01D 46/0098 55/357 |
| 7,090,711 | B2 | * | 8/2006 | Gillingham ............ F02M 35/08 55/504 |
| 2006/0016163 | A1 | * | 1/2006 | O'Connor .......... B01D 46/0005 55/481 |
| 2011/0277441 | A1 | * | 11/2011 | Ayshford ........... B01D 46/0086 55/480 |
| 2016/0243923 | A1 | * | 8/2016 | Denninger ......... B01D 46/0006 |
| 2020/0230540 | A1 | * | 7/2020 | Schumacher .......... B01D 46/10 |

FOREIGN PATENT DOCUMENTS

| | | |
|---|---|---|
| DE | 2802369 A1 | 7/1979 |
| DE | 9101692 U1 | 5/1991 |
| DE | 202016001034 U1 | 4/2016 |
| EP | 0099212 A2 | 1/1984 |

OTHER PUBLICATIONS

European Search Report dated Jul. 22, 2021 issued in EP 21 16 4609 (with English translation of relevant parts).
European Search Report dated Jul. 21, 2021 issued in EP 21 16 4606 (with English translation of relevant parts).

* cited by examiner

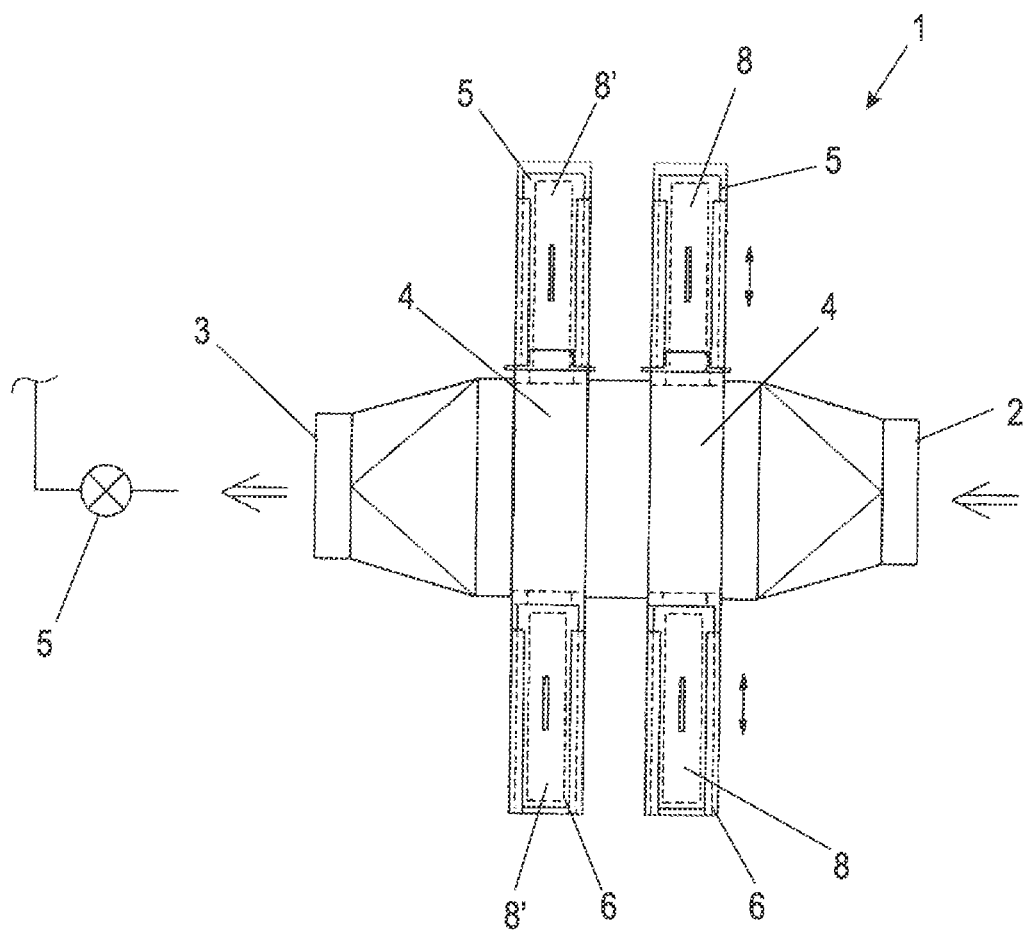

FILTER DEVICE AND METHOD FOR CHANGING A FILTER ELEMENT

CROSS-REFERENCE TO RELATED APPLICATIONS

This application claims priority under 35 USC 119 of German Application No. DE 10 2020 110 082.5, filed on Apr. 9, 2020, the disclosure of which is herein incorporated by reference.

BACKGROUND OF THE INVENTION

The present invention relates to a filter device for filtering particles from an air flow, comprising an inlet channel through which the air to be cleaned flows, at least one filter element through which the air can flow and which is replaceably held in a flow channel, and an outlet channel through which the cleaned air flows. Furthermore, the invention relates to a method for changing a filter element on a filter device.

For cleaning an air flow, drum filters are known in which a surface of the drum filter is cleaned via a suction nozzle, as is known from DE 28 02 369 A1. However, such cleaning during the production process in continuous operation is poorly suited for finer particles.

DE 91 01 692 U1 discloses a filter device in an air channel system that can be changed. For the purpose of changing, the filter device with the filter element is completely removed from the filter device and fed into a cleaning process. The disadvantage of such a filter device, however, is that the production process must be interrupted in order to change the filter elements.

SUMMARY OF THE INVENTION

Therefore, it is an object of the present invention to provide a filter device for filtering particles from an air flow and a method for changing a filter element, which enables a filter element to be changed without interrupting the process and is easy to operate.

This object is accomplished with a filter device for filtering particles from an air flow, comprising an inlet channel through which the air to be cleaned flows, at least one filter element through which a flow can pass and which is held replaceably in a flow channel, and an outlet channel through which the cleaned air flows, an insertion chamber which can be closed by a door and from which a filter element can be fed to the flow channel, and an output chamber which can be closed by a closure element and into which a filter element can be fed from the flow channel. A cover is attachable to the filter element and covers a filter cake on the filter element so that the unit consisting of filter element and cover can be removed together from the output chamber.

In the filter device according to the invention, the filter element is not simply removed from the output chamber, but a cover is first attached to the filter element to cover a filter cake on the filter element so that the unit consisting of filter element and cover can be removed from the output chamber. By attaching the cover to the filter element, particles on the filter cake are prevented from being dislodged by an air flow and entering the foreign air that is drawn in by the flow channel. Such suction of particles can cause significant damage to a downstream blower. By covering the filter element, the risk of loosening of the filter cake and swirling of particles is greatly reduced, so that the filter device can also be used in pressure-sensitive production processes with high requirements for air purity, for example in fiber production.

Preferably, guide means are formed on the filter element into which the cover can be inserted. The filter element can be designed, for example, as a filter cartridge in which a circumferential frame is provided around a filter surface. A guide means in the form of a groove or a guide strip can be formed on the frame on opposite walls. This allows the cover to be attached to the filter cartridge in a substantially sealed manner via a gap seal. Optionally, elastic sealing means can also be provided between the cover and the frame. The cover is preferably formed in the shape of a plate, for example by a metal sheet or a plastic plate. In this case, the cover can be at least partially transparent, so that the filter cake remains visible through the cover.

A latching or locking mechanism can be formed on the cover, in particular at an angle to the plate-shaped cover. The latching or locking mechanism can be latched or locked to the filter element, for example via a rotary part that can be locked to the filter element in the manner of a bayonet catch. Other latching mechanisms or latches can also be used to fix the cover to the filter element.

Preferably, a handle element is provided on the cover, in particular on the angled section, by means of which the locked unit consisting of filter element and cover can be pulled out of the output chamber. Preferably, no handle element is provided on the filter element on the side of the output chamber facing the opening, so that the risk of incorrect operation is reduced.

In the method according to the invention, a door of an insertion chamber is opened and a filter element is inserted before the door of the insertion chamber is closed. A passage is then opened from the insertion chamber to a flow channel in which a filter element to be cleaned is arranged. Furthermore, a closure element at an output chamber is opened and the filter element arranged therein is removed. Subsequently, the closure element of the output chamber is closed and the filter element is moved from the insertion chamber into the flow channel and the filter element arranged in the flow channel is moved from the flow channel into the output chamber, wherein for the removal of the filter element from the output chamber a cover is pushed onto the filter element and the unit of cover and filter element is removed from the output chamber together. This largely prevents contamination by sucking particles from the filter element and sucking them into the flow channel.

Preferably, in the filter device, the closure element of the output chamber is locked in the closed position via a locking mechanism when the door on the insertion chamber is open and the output chamber and the insertion chamber are connected to the same flow channel. This can prevent incorrect operation when replacing a filter element, since the closure element of the output chamber can only be opened when the door on the insertion chamber is closed. In this case, the locking mechanism is effective at the same shaft at which the insertion chamber, the flow channel and the output chamber are connected to each other and form a common shaft. The shaft may preferably be oriented vertically as a drop shaft, but orientation horizontally or in any other direction is also possible. The filter device can have several such shafts in succession in the direction of flow.

To ensure that the door on the insertion chamber and the opening between the insertion chamber and the flow channel are not open at the same time, the door for opening and closing the insertion chamber can be movable together with the cover. A corresponding opening in the cover then releases the opening between the insertion chamber and the flow channel only when the sliding door is in a closed position.

Preferably, at least two filter elements are arranged one behind the other in the flow channel, which are designed, for example, as coarse filters and fine filters. Each filter element can have a filter surface on which suspended particles and particulates are filtered out of the air, for example by screens, fabrics, wires or nonwoven materials.

The filter elements are preferably coded by a different geometry and can each be inserted only into one of two adjacent insertion chambers of two or more adjacent insertion chambers. This ensures that only one insertion chamber is assigned to each filter element by a specific geometry, so that interchanging of the filter elements is ruled out. Particularly when different filter elements are used as coarse filters or fine filters, coding by means of a geometry can prevent another filter element from being inserted into a specific insertion chamber. Such coding can, for example, be formed by different widths, different thicknesses or other geometric designs, such as bevels, projections or pins.

BRIEF DESCRIPTION OF THE DRAWINGS

The invention is explained in more detail below by means of an exemplary embodiment with reference to the accompanying drawings, wherein:

FIG. 1 shows a schematic view of a filter device according to the invention;

DETAILED DESCRIPTION OF THE EMBODIMENTS

Figure 2A:
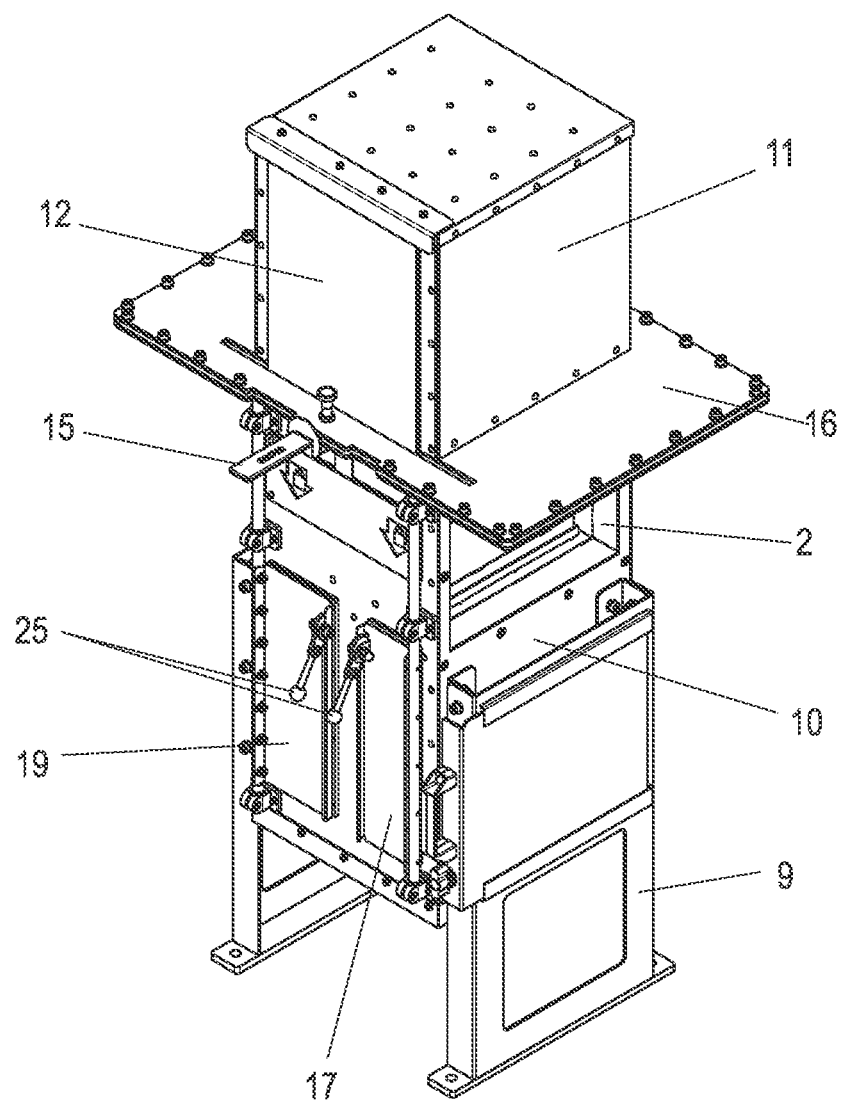
FIGS. 2A to 2D show several perspective views of the filter device in an operating position.

A filter device 1 is used for the filtration of an air flow, for example in a production plant for fibers or filaments or for the purification of combustion exhaust gases. The filter device 1 comprises an inlet channel 2, at which the air to be cleaned flows in, and an outlet channel 3, from which the cleaned air flows out. Between the inlet channel 2 and the outlet channel 3, one or more chambers are arranged in a flow channel 4, in which a filter element 8 or 8' can be positioned.

In order to be able to change the filter element arranged in the flow channel 4 during operation, an insertion chamber 5 and an output chamber 6 are provided adjacent to the flow channel 4. Here, an inlet channel 2 is connected to a chamber in the flow channel 4, which in turn is connected to the outlet channel 3. Such a shaft can be arranged one or several times in succession, as seen in the direction of flow, for example in order to use a filter element 8 as a coarse filter and a filter element 8' as a fine filter. However, the replacement of the used filter elements 8 or 8' is carried out in the same way.

In operation, a filter element 8 or 8' is arranged in the flow channel 4 and is supported by a stop or a filter element 8 or 8' in the output chamber. To insert a new filter element 8 or 8', said filter element is inserted into the associated insertion chamber 5, which is then closed. Subsequently, a filter element 8 or 8' is removed at the output chamber 6, so that either immediately or after closing a closure element at the output chamber 6, the filter element 8 or 8' arranged in the flow channel 4 is displaced into the output chamber 6, optionally via a spring element or gravity. Then the filter element 8 or 8' arranged in the insertion chamber 5 can slide down into the flow channel 4, optionally by gravity or a spring element.

Figure 2B:
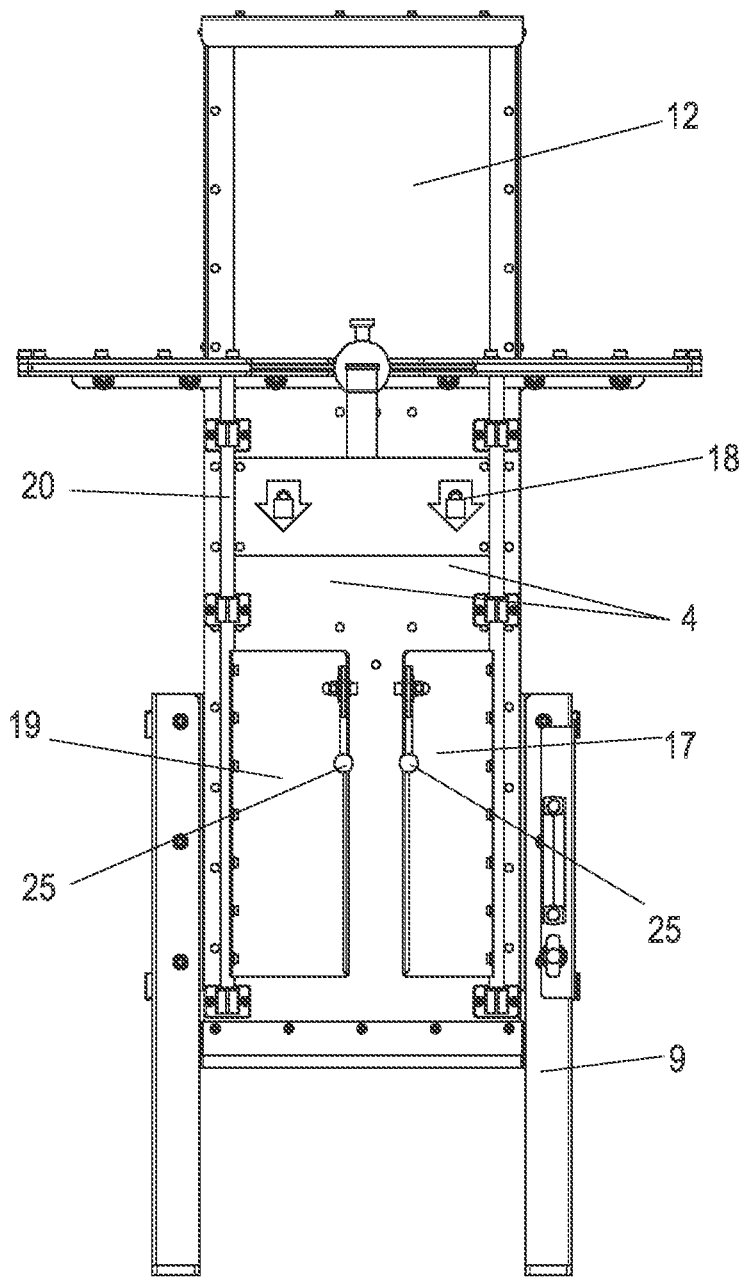

The principle of the filter device, shown only schematically in FIG. 1, is now described in detail:

FIGS. 2A and 2B show the filter device 1, which has a frame 9 on which a housing 10 is held. The housing 10 is formed in a central region as a flow channel, which is connected on one side to an inlet channel and on the opposite side to an outlet channel. Between the inlet channel 2 and the outlet channel 3, two chambers are formed on the flow channel 4, on each of which a filter element 8 or 8' can be positioned.

The housing 10 has a hood 11 in the upper area, on which two insertion chambers 5 for a filter element 8 or 8' are formed. Each insertion chamber 5 can be closed via a door 12, which is designed as a sliding door and can be moved via a handle element 15. In FIGS. 2A and 2B, both openings to the insertion chambers 5 are closed.

Two output chambers 6 are arranged below the flow channel 4, wherein one output chamber 6 is closable via a closure element 17 and another output chamber is closable via a closure element 19. The closure element 17 is rotatably mounted on an axle 18, and the closure element 19 is rotatably mounted about an axle 20. The closure elements 17 and 19 can each be locked in the closed position via an actuating lever 25.

Figure 2C:
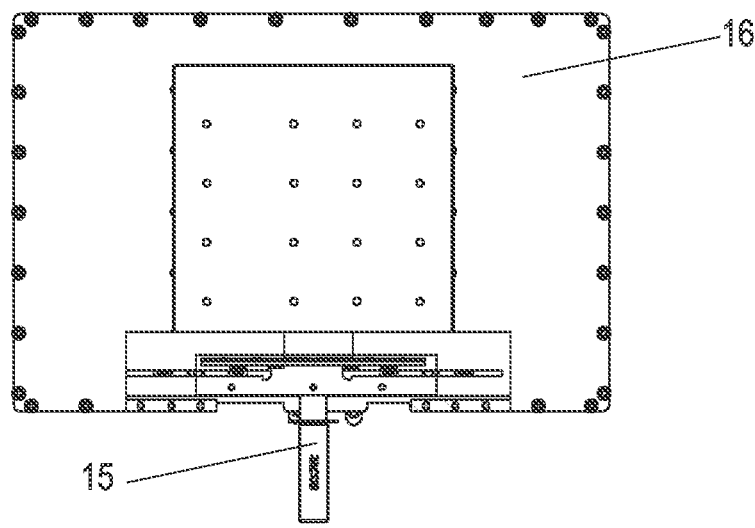
Figure 2D:
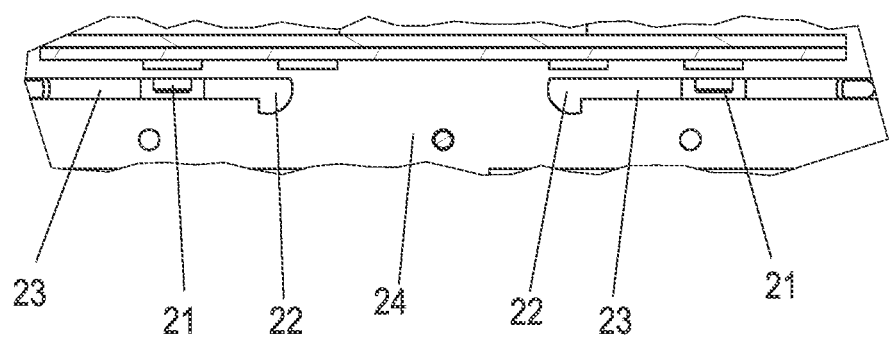

In the operating position, the two closure elements 17 and 19 of the output chambers 6 are locked against opening. For this purpose, a blocking element is provided which is displaceable together with the door. As can be seen from the plan view of FIG. 2C and the enlarged view of FIG. 2D, the blocking element comprises a slot 23 on which a widened portion 22 is formed at the end. A web 21, which is rectangular in cross-section, engages in the slot 23 and is blocked against rotational movement by the walls on the slot. In this case, the web 21 is connected to the axle 18 in a rotationally fixed manner or is formed integrally therewith. The web 21 on the left side in FIG. 2D is non-rotatably connected to or integral with the axle 20. By blocking a rotational movement of the webs 21, a pivoting movement of the closure elements 17 and 19 is thus prevented. In this central position of the door 12, an inadvertent opening of the closure elements 17 and 19 is thus prevented, since a new filter element 8 or 8' must first be inserted into an insertion chamber 5 during a replacement process.

Figure 3A:
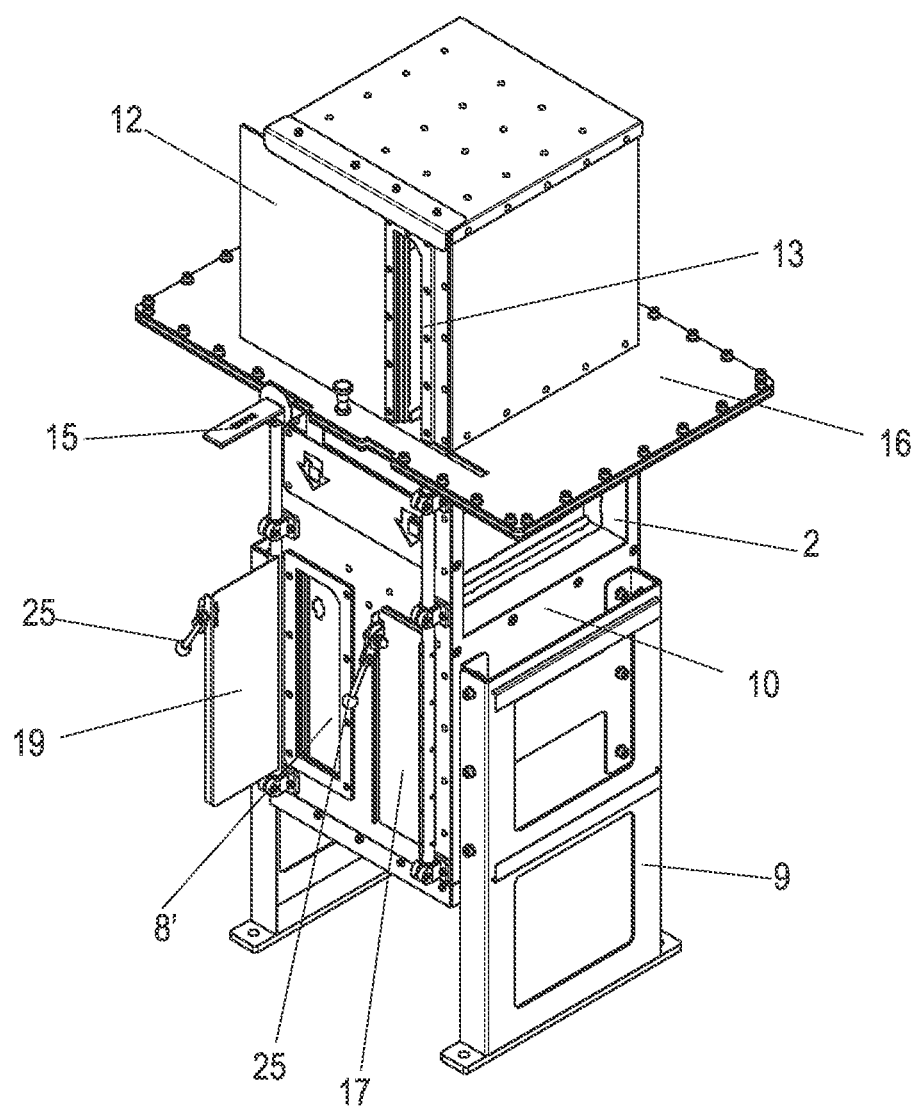
FIGS. 3A through 3D show several views of the filter device of FIG. 2 with the first insertion chamber open.
Figure 3B:
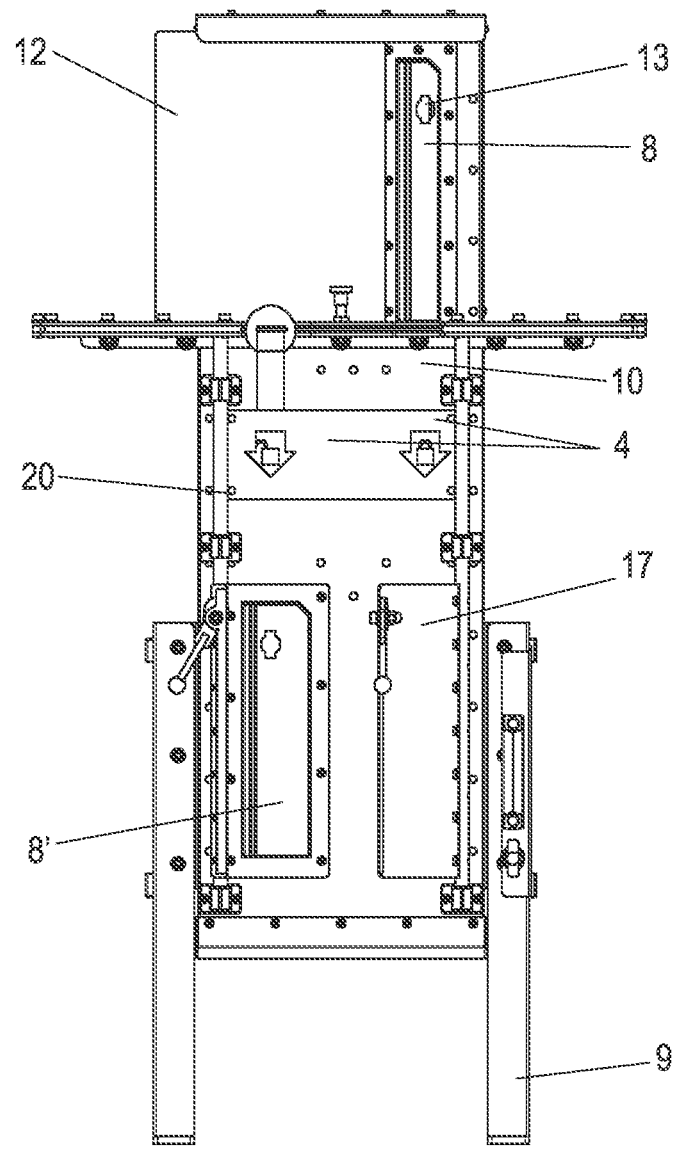
Figure 3C:
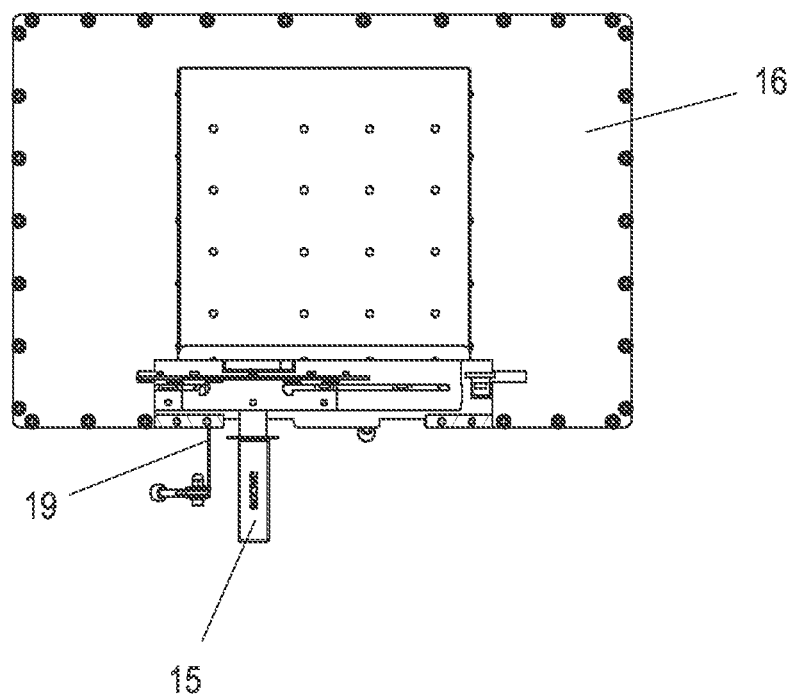
Figure 3D:
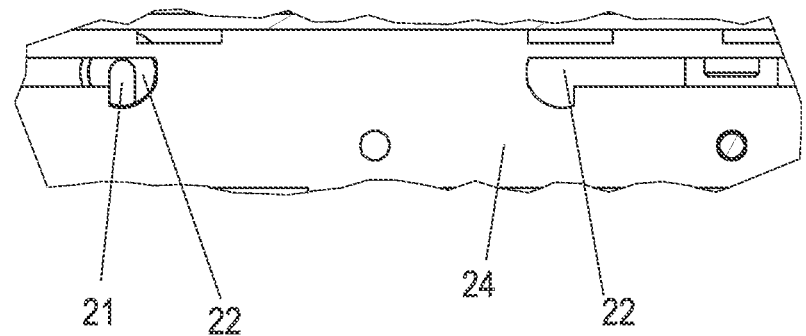

In FIGS. 3A and 3B, the filter device 1 is shown in a position in which the door 12 has been displaced to open an opening 13 for the insertion chamber 5 on the right-hand side. The door 12 is displaced by means of the handle element 15, which is also used at the same time to displace the blocking element. Handle element 15 is mounted on a plate 16, which guides the handle element 15. When the insertion chamber 5 is open on the right-hand side, a filter element 8 can be inserted, wherein the geometry of the insertion chamber 5 on the right-hand side is designed in such a way that only a specific filter element 8 can be inserted, for example all filter elements 8 of the same geometry, which then each form a coarse filter.

In this position of the door 12, moreover, the locking element 19 can be opened on the left side. This is due to the fact that the blocking element has been displaced with a plate 24, so that the web 21 on the axle 20 is now no longer arranged in the area of the slot 23, but in the area of the widened portion 22. The widened portion 22 has a greater width in the longitudinal direction of the slot 23 than the slot 23, so that the web 21 can be rotated together with the axle 20 in order to open the closure element 19. In this position, the filter element 8' in the output chamber 6 can optionally be pulled out.

Figure 4A:
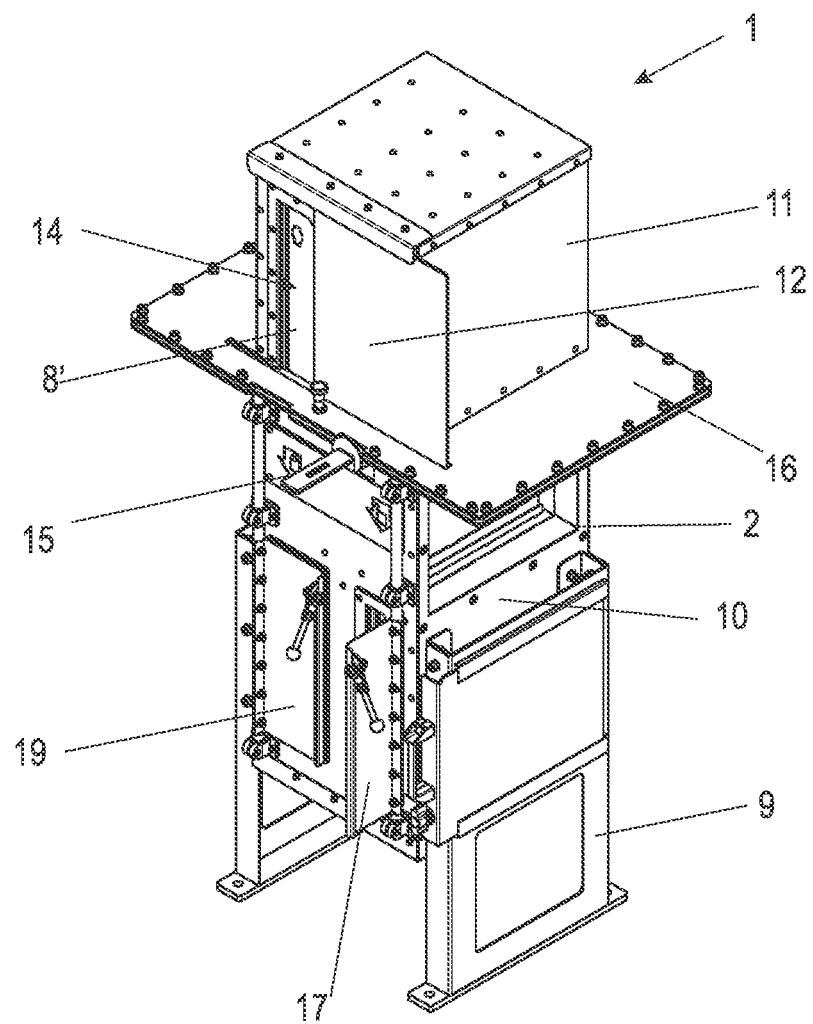
FIGS. 4A through 4D show several views of the filter device of FIG. 2 with the first output chamber open.
Figure 4B:
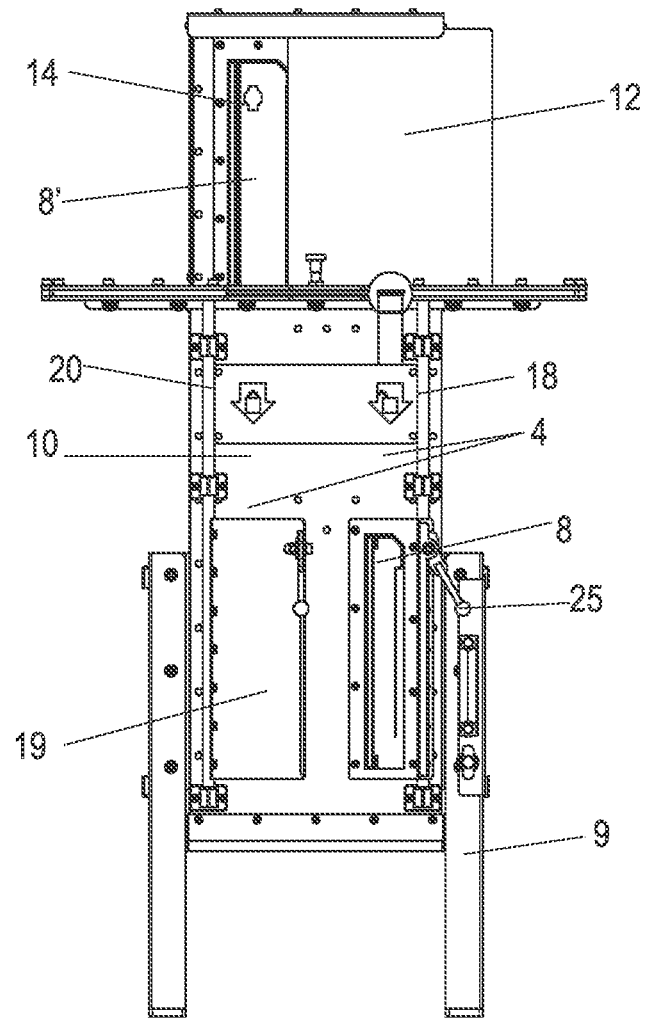
Figure 4C:
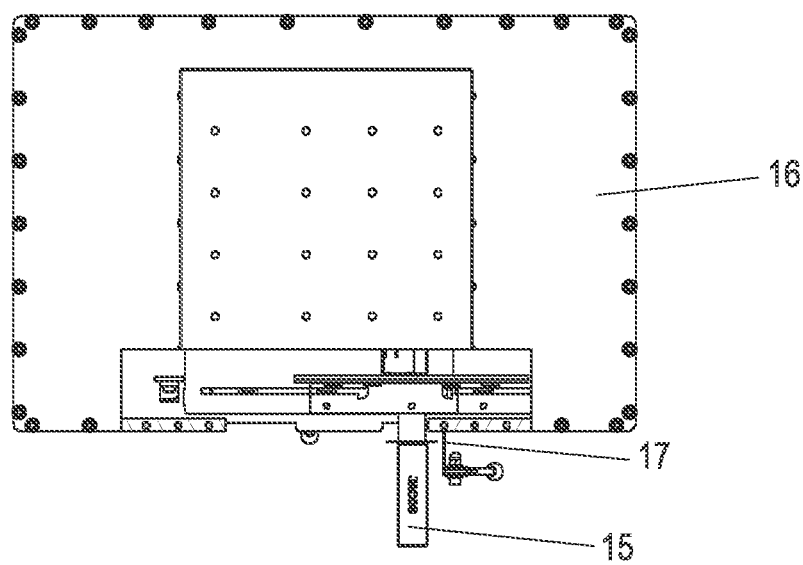
Figure 4D:
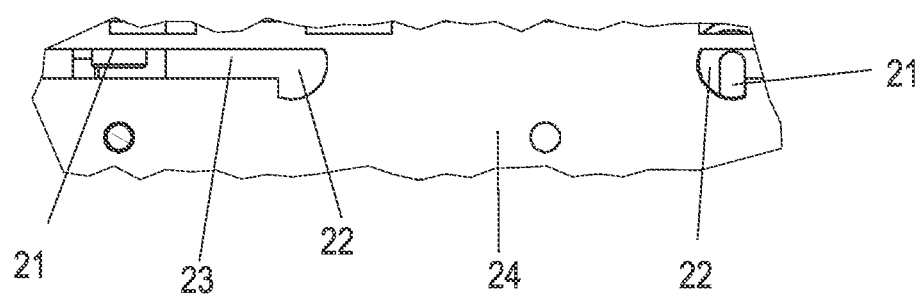

If the filter element 8 in the flow channel 4 is to be replaced first during the filter change, the door 12 is closed and moved to the position shown in FIGS. 4A and 4B after the filter element 8 has been inserted into the insertion chamber 5. The door 12 closes the opening 13 to the insertion chamber 5 on the right side, but exposes an opening 14 to the insertion chamber 5 on the left side for a filter element 8'. By moving the door 12 to the right end position, the blocking element has also been displaced, so that now the web 21, which is connected to or integrally formed on the axle 18, is arranged in the widened portion 22, so that now the closure element 17 can be pivoted about the axle 18. In this position, a filter element 8 can now be removed from the output chamber 6. By removing the filter element 8 arranged in the output chamber 6, the filter element 8 arranged in the flow channel 4 to be changed can now slide downwards, so that the filter element 8 in the insertion chamber 5 can thereby slide downwards into the flow channel 4. In practice, it is often the case that the filter element 8 located in the flow channel 4 is pressed against a stop by the air flow to be cleaned, in particular when foreign air is drawn in through the open output chamber 6. Then a displacement of the filter element 8 in the flow channel and the filter element 8 in the insertion chamber 5 takes place only when the closure element 17 is closed, so that a negative pressure builds up in the output chamber 6, which ensures that the filter element 8 in the flow channel 4 is detached. Optionally, a displacement of the filter elements 8 can also be supported or stimulated by mechanical means.

After the filter element 8 has been changed as a coarse filter in the flow channel 4, the filter element 8' can now be changed as a fine filter. For this purpose, a cleaned filter element 8' is first inserted into the insertion chamber 5 when the door 12 is in the right end position as shown in FIG. 4B. Subsequently, the door 12 can be moved to the left end position shown in FIG. 3B. In this position, the left insertion chamber 5 is closed and a passage from the insertion chamber 5 to the flow channel 4 is opened. In addition, the closure element 19 is to be opened in order to remove the filter element 8' from the output chamber 6.

To remove the filter elements 8 and 8', a cover 32 can be inserted into the respective filter elements 8 or 8', which can be mounted on the frame 9.

Figure 5B:
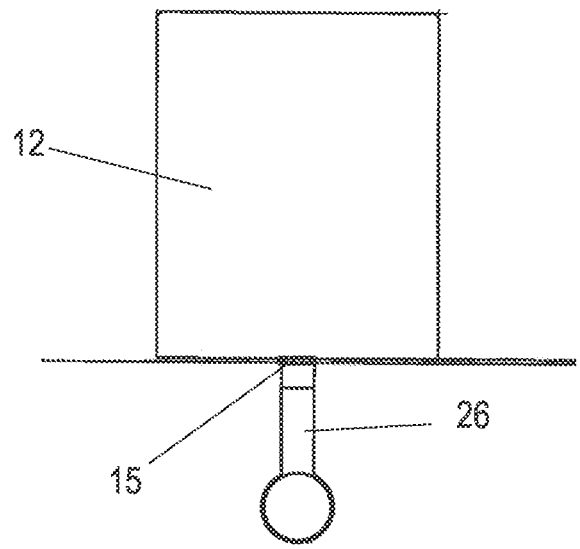
FIGS. 5A and 5B show two detailed views of a cover element between the insertion chamber and the flow channel.
Figure 5A:
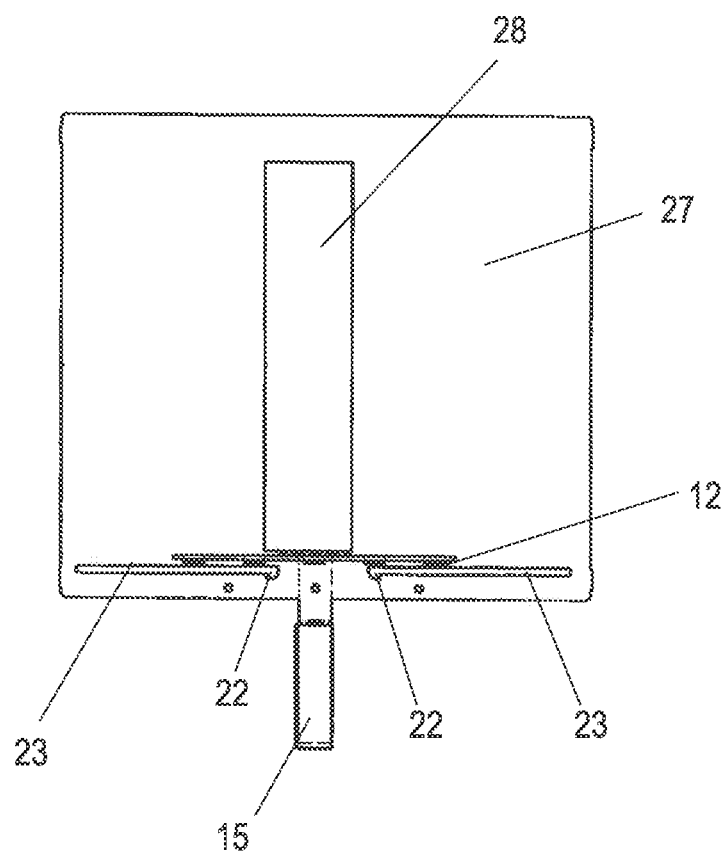

FIGS. 5A and 5B show the door 12, which is movable together with a cover 27. The cover 27 has an opening 28 and can thus selectively open or close a passage between an insertion chamber 5 and the flow channel 4. The width of the opening 28 is formed to be wide enough to allow all filter elements 8 or 8' to slide through the opening 28. On the cover 27, a front area is also formed as a blocking element in which the slots 23 with the end-side widened portion 22 are recessed. Thus, with the movement of the door 12 via the handle element 15, a blocking of the closure elements 17 and 19 can take place simultaneously, and in addition, a connection between an insertion chamber 5 and the flow channel 4 can be opened and closed.

The design of the door 12 and the cover 27 ensures that the insertion chamber 5 is always closed to the flow channel 4 when a filter element 8 is changed.

When the insertion chamber is opened at an opening 13 at the front, as shown in FIG. 3B, the cover 27 covers the opening to the flow channel 4 so that only a small amount of foreign air can be drawn in. When the new filter element 8 is inserted into the insertion chamber 5, the door 12 can be pivoted to the position shown in FIG. 4B, thereby uncovering the opening between the insertion chamber 5 and the flow channel 4, since the opening 28 is then located under the insertion chamber 5. However, the flow channel 4 is sealed to the outside since the door 12 is closed. In this position, the closure element 17 can then be opened to remove the filter element 8 from the output chamber. A gap between the filter element 8 in the flow channel 4 and the output chamber 6 can be dimensioned so small that only slight foreign air is drawn in when the filter element 8 is removed, but this results in negligible pressure fluctuations and does not impair the production process. Furthermore, a projection is formed on the handle element 15 as a marking element 26, so that the user can more easily see a middle closing position or an opening position.

Figure 6:
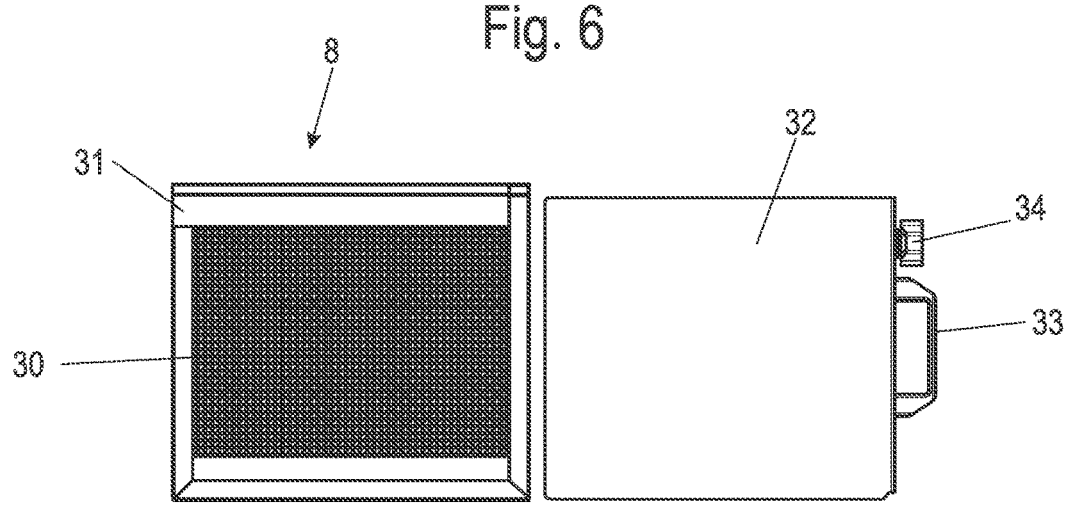
FIG. 6 shows a view of a filter element and cover before assembly.

In FIG. 6, a filter element 8 is shown which has a filter surface 30, for example a screen, a fabric, a perforated grid or a non-woven material, wherein the filter surface 30 is surrounded by a frame 31. Guide means, for example grooves, are formed on the frame 31 in order to be able to cover the filter surface 30. Here, a filter cake deposited on the filter surface 30 can be covered by the cover 32, so that when the filter element 8 is removed from the output chamber 6, as far as possible, no particles are sucked in by the foreign air, which then enters the flow channel 4.

To prevent a user from manually removing the filter element 8 from the output chamber 6 without the cover 32, a rotating part 34 of a latching or locking mechanism is provided on the cover 32. After the cover 32 has been pushed onto the filter element 8, the rotating part 34 can be used to lock or latch the cover 32 to the filter element 8, after which a handle element 33 on the cover 32 can be used to pull the unit comprising the filter element 8 and the cover 32 out of the output chamber 6. The rotating part 34 can be designed, for example, as a bayonet catch, which can be inserted into an opening on the filter element 8 in a first position and then effects locking by rotating through 90°.

Figure 7A:
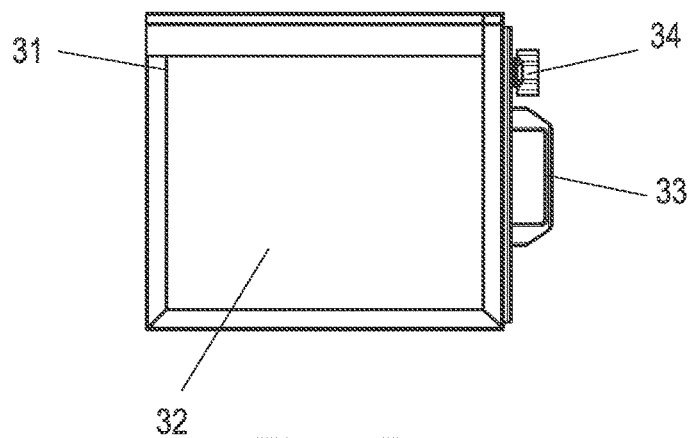
FIGS. 7A to 7C show several views of the filter element of FIG. 6 with mounted cover.
Figure 7B:
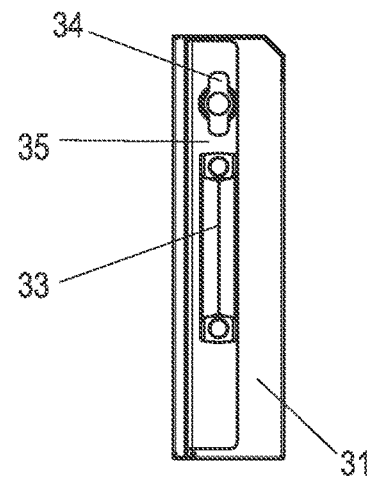

In FIGS. 7A and 7b, the cover 32 is arranged on the filter element 8, and it can be seen that the cover 32 is surrounded on the edge by the frame 31. As a result, the filter element 8 is largely sealed. The cover 32 is plate-shaped and can be formed from a metal sheet or plastic, for example a transparent plastic, so that the inner region of the filter element 8 remains visible.

The cover 32 comprises an angled section 35 on which the rotating part 34 is rotatably mounted and on which the handle element 33 is fixed. The cover 32 can be designed in one or more parts.

Figure 7C:
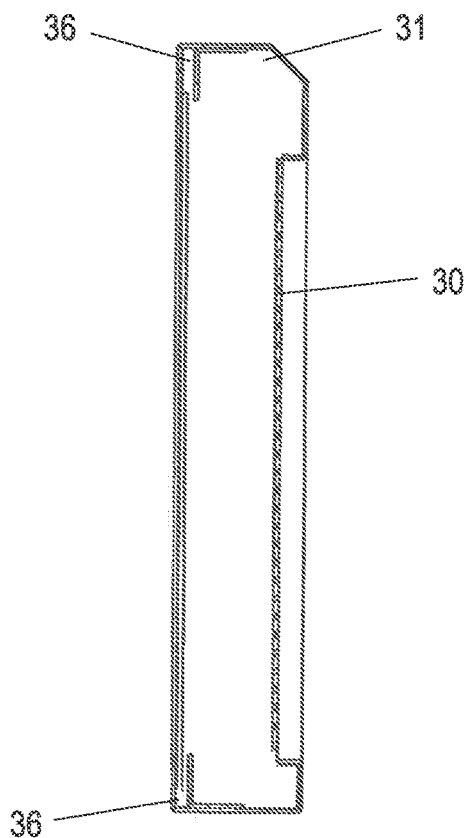

FIG. 7C shows a section through the filter element 8, and it can be seen that a groove 36 is formed on opposite sides, into which an edge of the plate-shaped cover 32 can be inserted. At the end face, the cover 32 can then be locked to the frame 31 via the rotating part 34.

Figure 8:
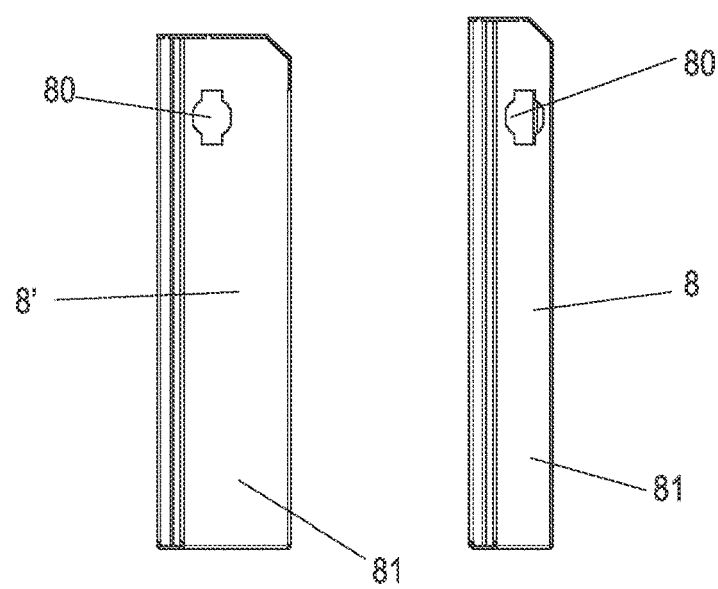
FIG. 8 shows a view of two different filter elements.

FIG. 8 shows two different filter elements 8 and 8', which have different thicknesses and can optionally also have different heights. This ensures that only one filter element 8 of a predetermined type can be inserted into a single opening of the insertion chamber 5 in each case, so that incorrect operation is reliably prevented by the geometry of the filter elements 8 and 8'. Each filter element 8 includes an opening 80 on the frame 31 that is engageable with the rotating part 34 on the cover 32. Optionally, other locking mechanisms or latching mechanisms can be used to create a releasable connection between the cover 32 and a filter element 8 or 8'.

In the exemplary embodiment shown, the filter device 1 has two shafts arranged one behind the other in the direction of flow, wherein each shaft has a closable insertion chamber 5, a chamber in the flow channel 4 and a closable output chamber 6. It is of course possible to provide only one shaft instead of two shafts, or to provide more than two shafts on a filter device 1. In the illustrated exemplary embodiment, the door 12 is designed to be slidable, while the closure elements 17 and 19 are pivotally mounted. It is, of course, also possible to design the door 12 so as to be pivotable as well, and in particular a multi-part door with different leaves can be provided instead of the single-part door. In addition, the closure elements 17 and 19 can also be designed to be movable instead of pivotable.

LIST OF REFERENCE NUMERALS

1 Filter device
2 Inlet channel
3 Outlet channel
4 Flow channel
5 Insertion chamber
6 Output chamber
8, 8' Filter element
9 Frame
10 Housing
11 Hood
12 Door
13 Opening
14 Opening
15 Handle element
16 Plate
17 Closure element
18 Axle
19 Closure element
20 Axle
21 Web
22 Widened portion
23 Slot
24 Plate
25 Actuating lever
26 Marking element
27 Cover
28 Opening
30 Filter surface
31 Frame
32 Cover
33 Handle element
34 Rotating part
35 Angled section
36 Groove
80 Opening

What is claimed is:

1. A filter device for filtering particles from an air flow, comprising:
   an inlet channel through which air to be cleaned flows,
   a flow channel connected to the inlet channel,
   at least one filter element through which a flow can pass and which is held replaceably in the flow channel, and
   an outlet channel through which the cleaned air flows,
   an insertion chamber having a door that is configured to close the insertion chamber and from which insertion chamber the at least one filter element can be fed to the flow channel,
   an output chamber having a closure element configured for closing the output chamber and into which output chamber the at least one filter element can be fed from the flow channel, and
   a cover configured to be inserted into the output chamber and attached to the at least one filter element inside the output chamber, and which covers a filter cake on the at least one filter element so that a unit consisting of the at least one filter element and cover can be removed together from the output chamber.

2. The filter device according to claim 1, wherein guide means are formed on the at least one filter element, into which the cover can be inserted.

3. The filter device according to claim 1, wherein the at least one filter element is designed as a filter cartridge which has a circumferential frame around a filter surface.

4. The filter device according to claim 3, wherein a guide means in the form of a groove is formed on each of two opposite walls of the frame.

5. The filter device according to claim 1, wherein the cover is designed plate-shaped.

6. The filter device according to claim 1, further comprising a latching or locking mechanism configured to lock the cover to the at least one filter element.

7. The filter device according to claim 6, wherein the latching or locking mechanism comprises a rotating part which can be locked to the filter element in the manner of a bayonet catch.

8. The filter device according to claim 6, wherein the latching or locking mechanism is held at an angled section extending angularly from the cover, in particular at a right angle.

9. The filter device according to claim 1, wherein a handle element is provided on the cover, by means of which handle element the unit consisting of the at least one filter element and cover can be pulled out of the output chamber.

10. A method for changing a filter element on a filter device, comprising the following steps:
   opening a door of an insertion chamber of the filter device and inserting a filter element;
   closing the door of the insertion chamber;
   opening a passage from the insertion chamber to a flow channel in which a filter element to be cleaned is arranged;
   opening a closure element on an output chamber and removing a filter element from the output chamber;
   closing the closure element of the output chamber and moving the filter element from the insertion chamber into the flow channel and the filter element from the flow channel into the output chamber, wherein
   a cover is pushed onto the filter element so as to be disposed inside the output chamber, the cover being configured for removing the filter element from the output chamber, and a unit consisting of the cover and the filter element in the output chamber is removed from the output chamber together.

11. The method according to claim 10, wherein the cover is latched or locked to the filter element in the output chamber after being slid onto that filter element.

12. The filter device according to claim 4, wherein the cover is configured to be slid onto the groove to cover the filter cake.

13. The filter device according to claim 6, wherein the cover comprises a planar surface configured for covering the filter cake, and a second surface perpendicular to the planar surface, wherein the second surface contains the latching or locking mechanism.

* * * * *